J. KEELER & C. C. HARRIS.
Hubs of Wheels for Wind-Mills.

No. 151,399.                      Patented May 26, 1874.

Witnesses.

Inventors.
Josiah Keeler
Charles C. Harris.

UNITED STATES PATENT OFFICE.

JOSIAH KEELER AND CHARLES C. HARRIS, OF KEWANEE, ILLINOIS.

IMPROVEMENT IN HUBS OF WHEELS FOR WINDMILLS.

Specification forming part of Letters Patent No. 151,399, dated May 26, 1874; application filed November 7, 1873.

*To all whom it may concern:*

Be it known that we, JOSIAH KEELER and CHARLES C. HARRIS, both of Kewanee, in the county of Henry and State of Illinois, have invented certain new and useful Improvements in Windmills; and we do hereby declare the following to be a full, clear, and exact description of the invention, such as will enable others skilled in the art to which it pertains to make and use it, reference being had to the accompanying drawings, which form part of this specification.

Our invention relates to a peculiar construction of the hub particularly adaptable to wheels of windmills, and is formed of two parts, one of larger diameter than the other. The outer part of the hub, which is by preference of the smaller diameter, is provided with a series of teeth or serrations formed on its outer periphery, and these serrations or teeth are inclined at a certain angle, and this part is also provided on its inner periphery with projections having holes formed therein for the reception of bolts, by means of which the two parts are bolted together. The inner or larger portion of the hub has also a series of serrations or teeth formed on its outer periphery, and a corresponding series of teeth or serrations on its inner periphery, such serrations or teeth being inclined at a certain angle similar to the outer or smaller portion of the hub, which latter fits into the larger portion, and between these three series of teeth or serrations the fans or vanes of the wind-wheel are inserted. This larger portion of the hub has also projections formed on its inner periphery, corresponding with the projections of the outer or smaller portion of the hub, such projections having corresponding holes formed therein for the reception of bolts or pins, by means of which the two parts are bolted together. These serrations or teeth form a firm bearing for the ends of the fans or vanes, which, when inserted, and the two portions are bolted together firmly, clasp and hold such fans or vanes in position.

It will be readily seen that by this arrangement of the hub a firm support for the fans or vanes is provided, as well as a ready means to easily repair such fans or vanes when either of them becomes damaged or new ones inserted, if it becomes necessary.

In order that our invention may be better understood, we will proceed to describe the same by aid of the accompanying drawings.

Figure 1:
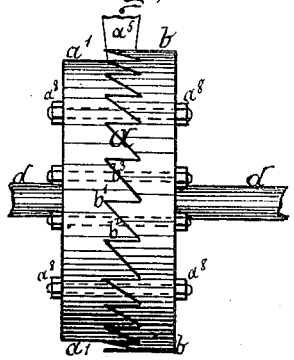
Figure 3:
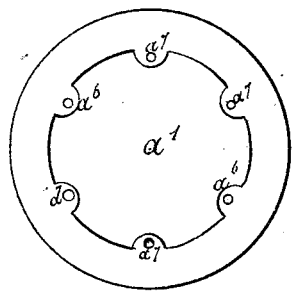
Figure 4:
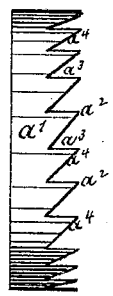
Figure 2:
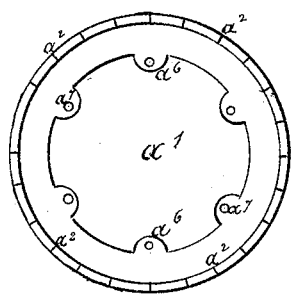
Figure 6:
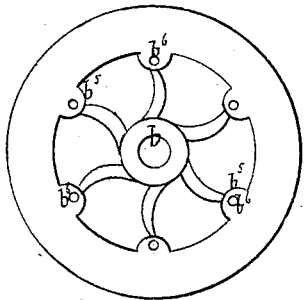
Figure 7:
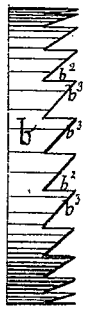
Figure 5:
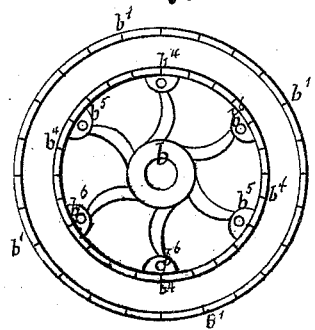

Figure 1 is a side elevation, showing the two parts bolted together, and forming the hub. Fig. 2 is a plan, Fig. 3 an under-side view, and Fig. 4 a side elevation, of the smaller portion of the hub. Fig. 5 is a plan, Fig. 6 an under-side view, and Fig. 7 a side elevation of the larger portion of the hub.

$a^1$ is the outer or smaller portion of the hub $a$, provided on the outer periphery with a series of serrations or teeth, $a^2$, set at an angle, and having a horizontal side, $a^3$, and an inclined side, $a^4$, for the reception of the fans or vanes $a^5$. This portion $a^1$ of the hub $a$ has also formed on its inner face or periphery a number of projections, $a^6$, having holes, $a^7$, formed therein for the reception of bolts or pins, $a^8$, by means of which the two parts or sections of the hub are bolted together. The inner or larger portion $b$ of the hub has also a series of serrations or teeth, $b^1$, formed at an angle, having a horizontal side, $b^2$, and an inclined side, $b^3$, and this portion is further provided on its inner periphery with another series of teeth or serrations, $b^4$, formed similarly to those on the outer periphery. $b^5$ are projections formed on the inner face or periphery of the part $b$, such projections $b^5$ having holes $b^6$ formed therein for the reception of bolts or pins $a^8$, such projections $b^5$ corresponding with the projections $a^6$ of the smaller or outer portion $a^1$ of the hub. In order to secure the fans or vanes $a^5$ in position in the hub, the two portions $a^1$ and $b$ are bolted loosely together; the fans or vanes $a^5$ are then inserted between the series of serrations or teeth $b^1$ and $b^4$ of the inner or larger portion $b$ and the series of serrations or teeth $a^2$ of the outer or smaller portion $a^1$, and when so inserted the bolts are tightened up, bringing the two sections $a^1$ and $b$ closely together, clasping or holding the fans or vanes $a^5$ securely in position. By means of these bolts or pins $a^8$ the fans or vanes $a^5$ may be readily removed from the hub when either of them becomes damaged, and a new one inserted in its place.

Having thus described our invention, what we claim, and desire to secure by Letters Patent, is—

1. In the wheel of a windmill, the hub $a$, formed in two parts, $a^1\ b$, having serrations or teeth $a^2\ b^2\ b^4$ formed thereon, substantially as shown and described.

2. In the wheel of a windmill, the hub $a$, formed in two parts, $a^1\ b$, having serrations or teeth $a^2\ b^2\ b^4$, projections or ears $a^6\ b^5$, holes $a^7\ b^6$, and bolts or pins $a^8$, combined substantially as set forth.

In testimony that we claim the foregoing we have hereunto set our hands this 1st day of September, 1873.

JOSIAH KEELER.
CHARLES C. HARRIS.

Witnesses:
CHAS. NORTHROP,
E. R. KERR.